US011503065B2

(12) United States Patent
Linder

(10) Patent No.: US 11,503,065 B2
(45) Date of Patent: *Nov. 15, 2022

(54) DETERMINING DIGITAL VULNERABILITY BASED ON AN ONLINE PRESENCE

(71) Applicant: Orbis Technologies, Inc., Annapolis, MD (US)

(72) Inventor: Kojo Linder, Ellicott City, MD (US)

(73) Assignee: Orbis Technologies, Inc., Annapolis, MD (US)

( * ) Notice: Subject to any disclaimer, the term of this patent is extended or adjusted under 35 U.S.C. 154(b) by 220 days.

This patent is subject to a terminal disclaimer.

(21) Appl. No.: 17/026,489

(22) Filed: Sep. 21, 2020

(65) Prior Publication Data

US 2021/0067542 A1    Mar. 4, 2021

Related U.S. Application Data

(63) Continuation of application No. 15/869,209, filed on Jan. 12, 2018, now Pat. No. 10,785,250.

(51) Int. Cl.
*H04L 9/40* (2022.01)
*G06F 16/9535* (2019.01)
*G06F 16/2457* (2019.01)

(52) U.S. Cl.
CPC .... *H04L 63/1433* (2013.01); *G06F 16/24578* (2019.01); *G06F 16/9535* (2019.01)

(58) Field of Classification Search
CPC ........... H04L 63/1433; G06F 16/24578; G06F 16/9535
See application file for complete search history.

(56) References Cited

U.S. PATENT DOCUMENTS

| 5,941,944 A ‡ | 8/1999 | Messerly ................ G06F 16/10 |
| | | 709/203 |
| 2017/0154314 A1‡ | 6/2017 | Mones ............... G06Q 10/1053 |
| 2017/0359220 A1‡ | 12/2017 | Weith ...................... G06F 16/23 |
| 2018/0026996 A1‡ | 1/2018 | Park .................... H04L 63/1433 |
| | | 726/23 |

(Continued)

OTHER PUBLICATIONS

A. Srivastava and G. Geethakumari, "Measuring privacy leaks in Online Social Networks," 2013 International Conference on Advances in Computing, Communications and Informatics (ICACCI), 2013, pp. 2095-2100 (Year: 2013).*

(Continued)

*Primary Examiner* — Michael R Vaughan
(74) *Attorney, Agent, or Firm* — Edell, Shapiro & Finnan, LLC

(57) ABSTRACT

Methods, systems and computer program products are provided to determine an individual's risk of being targeted by a cyberattack based on quantifying their online presence. In some embodiments, online information pertaining to an individual, accessible through the clear web (e.g., Internet) or the dark web, is identified and used to calculate a digital vulnerability (DV) score. The DV score is used to determine the susceptibility of an individual of being targeted for a cyberattack or cybercrime based upon their online presence, and may be computed based upon personally identifying information (PII) features present on clear web and deep/dark web resources.

22 Claims, 10 Drawing Sheets

(56) References Cited

U.S. PATENT DOCUMENTS

| | | | |
|---|---|---|---|
| 2018/0027001 A1‡ | 1/2018 | Park | H04L 63/1416 |
| | | | 726/23 |
| 2018/0359244 A1‡ | 12/2018 | Cockerill | H04L 63/0823 |
| 2019/0007440 A1‡ | 1/2019 | Lavi | H04L 63/0227 |
| 2019/0207960 A1‡ | 7/2019 | Chu | G06F 17/18 |
| 2019/0266355 A1‡ | 8/2019 | Lockhart, III | H04L 63/1433 |
| 2019/0362069 A1‡ | 11/2019 | Park | G06F 11/3438 |

OTHER PUBLICATIONS

E. Aghasian, S. Garg, L. Gao, S. Yu and J. Montgomery, "Scoring Users' Privacy Disclosure Across Multiple Online Social Networks," in IEEE Access, vol. 5, pp. 13118-13130, 2017 (Year: 2017).* https://en.wikipedia.org/wiki/Klout, accessed Jan. 5, 2018, 5 pages.‡ https://www.forbes.com/sites/carolinehoward/2015/05/26/the-worlds-most-powerful-women-2015/#1797787644ec, accessed Jan. 5, 2018, 7 pages.‡

Rao, A., Spasojevic, N., Li, Z., & DSouza, T., "Klout score: Measuring influence across multiple social networks," 2015 IEEE International Conference on Big Data, Oct. 2015, pp. 2282-2289.‡

\* cited by examiner
‡ imported from a related application

| PII FEATURES | FEATURE STRENGTH |
|---|---|
| SOCIAL SECURITY NUMBER | 5 |
| PHONE # | 3 |
| CREDIT CARD NUMBER | 3 |
| RELATIVES | 2 |
| ADDRESS | 2 |
| CRIMINAL RECORD | 2 |
| LOCATION | 1 |
| FIRST NAME | 1 |
| LAST NAME | 1 |
| HOUSING INFO | 1 |
| NEIGHBORS | 1 |
| AGE | 0.2 |
| GENDER | 0.2 |
| ETHNICITY | 0.2 |
| POLITICAL PARTY | 0.2 |
| TITLE | 0.2 |
| RANK | 0.2 |
| MILITARY BRANCH | 0.2 |
| POLITICAL PARTY | 0.2 |

| ASSOCIATION TIER (LEVEL) | ASSOCIATION STRENGTH |
|---|---|
| DIRECT ASSOCIATION<br>FIRSTNAME#0 LASTNAME#0 —GOOGLE SEARCH→ PHONE NUMBER | 1 |
| 2ND TIER ASSOCIATION<br>FIRSTNAME#0 LASTNAME#0 —GOOGLE SEARCH→ NAME OF ASSOCIATE<br>FACEBOOK↘<br>FRIENDS NAMED LASTNAME#0 | 0.5 |
| 3RD TIER ASSOCIATION<br>FIRSTNAME#0 LASTNAME#0 —GOOGLE SEARCH→ NAME OF ASSOCIATE<br>FACEBOOK↘<br>FRIENDS NAMED LASTNAME#0<br>FACEBOOK↘<br>RELATIVES NAMED LASTNAME#0 | 0.25 |

FIG.4

A short list of leaked information obtained from an OPM hack:

1Name: FIRSTNAME#1 LASTNAME#1 Military: Army Rank: Staff Sergeant / E6Unit: UNIT X
Clearance: Secret Phone Number: XXX-XXX-XXXX
2Name: FIRSTNAME#2 LASTNAME#2 Military: Army Rank: Master Sergeant / E8Unit: UNIT X
Clearance: Secret Phone Number: XXX-XXX-XXXX
3Name: FIRSTNAME#3 LASTNAME#3 Military: Army Rank: Staff Sergeant / E6Unit: UNIT X
Clearance: Secret Phone Number: XXX-XXX-XXXX
4Name: FIRSTNAME#4 LASTNAME#4 Military: Army Rank: 1st Lieutenant / O2Unit: UNIT X
Clearance: Secret Phone Number: XXX-XXX-XXXX
5Name: FIRSTNAME#5 LASTNAME#5 Military: Navy Rank: Chief Petty Officer/ E7Unit: UNIT X
Clearance: Top Secret Phone Number: XXX-XXX-XXXX
6Name: FIRSTNAME#6 LASTNAME#6 Military: Navy Rank P01 (Petty Officer 1st Class) / E6 Unit: UNIT X
Clearance: Top Secret Phone Number: XXX-XXX-XXXX
7Name: FIRSTNAME#7 LASTNAME#7 Military: USMC Rank: Staff Sergeant / E6Unit: UNIT X
Clearance: Top Secret Phone Number XXX-XXX-XXXX
8Name: FIRSTNAME#8 LASTNAME#8 Military: USMC Rank: Gunnery Sergeant / E7Unit UNIT X
Clearance: Top Secret Phone Number XXX-XXX-XXXX Author= XXXXXX
Site: XXXXXX
Date: XXXX-XX-XX

FIG.5

DETERMINING DIGITAL VULNERABILITY BASED ON AN ONLINE PRESENCE

CROSS-REFERENCE TO RELATED APPLICATIONS

This application is a continuation of U.S. application Ser. No. 15/869,209, filed on Jan. 12, 2018, the contents of which are hereby incorporated by reference in their entirety.

STATEMENT REGARDING FEDERALLY SPONSORED RESEARCH OR DEVELOPMENT

This invention was made with government support under Contract #D17FPC00001 awarded by Department of the Interior. The government has certain rights in the invention.

FIELD OF THE INVENTION

Present invention embodiments relate to determining an individual's digital vulnerability, and more specifically, to determining an individual's risk of being targeted for cyberattack or cybercrime based on their online presence.

BACKGROUND

With the rapid growth and expansion of online services, social media, and other web-based information repositories, maintaining control and privacy of personally identifying information (PII) has become considerably challenging. For example, social media sites may contain information about a person's birthday, residence, family members, and friends. Credit monitoring agencies, banks, government databases, and other types of databases may contain social security numbers as well as aspects of an individual's financial status. Insurance companies or medical providers may have information pertaining to an individual's health or psychological status. Although safeguards are implemented to prevent the acquisition and release of PII from these various data sources, data breaches still occur on a frequent basis. In some instances, a data breach is reported as soon as it is discovered. In other cases, a data breach is not reported until months after detection, and in some cases, may never be reported.

High-profile, high-ranking, or influential individuals (e.g., celebrities, government officials, executives, affluent individuals, researchers or scientists with access to controlled biological materials, engineers or other individuals with access to government intelligence, etc.) are at increased risk of being targeted for a cyberattack Cyberattacks also routinely target corporations or organizations (e.g., insurance providers, banking institutions, credit monitoring agencies, dating websites, government agencies, etc.), and the obtained information corresponding to large numbers of individuals is frequently posted on the dark web, a portion of the web that is not accessible through traditional web engines, such as GOOGLE®. Generally, access to information provided on the dark web requires specialized browsers, and in some cases, knowledge of where to look online for the information.

In the social media community (e.g., TWITTER®, YOUTUBE®, LINKEDIN®, FACEBOOK®, FOURSQUARE®, WIKIPEDIA®, BING®, GOOGLE+®, and INSTAGRAM®), the Klout algorithm may be used to assign a score that evaluates an online user's influence across the social media space. Each social media community may utilize their own combination of social media features and weights in order to determine a Klout score. For example, features such as the number of TWITTER® followers, the number of retweets, the number of likes per post may be important to the TWITTER® community, while the number of friends, the number of likes per post, the number of comments per post, and the number of unique commenters may be important to the FACEBOOK® community. The Klout score algorithm is provided in the following references (Rao, A. et al., Klout score: Measuring influence across multiple social networks, 2015 IEEE International Big Data Conference—Workshop on Mining Big Data in Social Networks (2015) p. 2282-2289; https://en.wikipedia.org/wiki/Klout). Forbes Magazine published a list of "Most Powerful Women" in 2015, based on determining highest Klout scores. Not surprisingly, women with the highest Klout scores were predominantly politicians or celebrities receiving considerable notoriety in popular culture (https://www.forbes.com/sites/carolinehoward/2015/05/26/the-worlds-most-powerful-women-2015).

With the ever-increasing frequency and secrecy of cyberattacks, and the increasing number of online locations where PII may be posted, it is difficult to assess the risk of a particular individual being targeted for a cyberattack.

SUMMARY

According to the techniques disclosed herein, methods, systems, and computer program products are provided to determine an individual's or entity's risk of being targeted by a cyberattack or cybercrime based on quantifying their online presence. In some aspects, online information pertaining to an individual is accessed through the clear web (e.g., Internet) and/or the dark web. This online information is evaluated for the presence of personally identifying information (PII) features, which are used to calculate a digital vulnerability (DV) score. The DV score is a measure of the susceptibility of an individual of being targeted for a cyberattack or cybercrime based upon their online presence. In some cases, the magnitude of the DV score reflects the amount of online information and is proportional to the risk of a cyberattack.

The techniques provided herein include, but are not limited to, identification and extraction of PII features from multiple clear web and/or deep/dark web data sources, thereby providing a comprehensive, quantifiable measure of the amount of online PII features pertaining to an individual, organization, or other entity. The techniques provided herein may identify and extract PII features from any type of online database or other online data resource, e.g., public databases, private databases, social media websites, newsfeeds, forums, email, dark/deep web forums or web pages, etc., over a given period. From the extracted PII features, a DV score indicating risk may be generated.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

Generally, like reference numerals in the various figures are utilized to designate like components. The invention may take form in various components and arrangements of components, and in various steps and arrangements of steps. The drawings are only for purposes of illustrating preferred embodiments and are not to be construed as limiting the invention. The accompanying drawings, which are incorporated herein and form part of the specification, illustrate various embodiments of the present invention and, together with the description, further serve to explain the principles of various embodiments of the invention and to enable a person skilled in the pertinent art to make and use the various embodiments of the invention. In the drawings, like reference numbers indicate identical or functionally similar elements.

FIG. 4 is an illustration showing example weights corresponding to association strength and weights corresponding to PII feature strength, according to embodiments of the present invention.

FIG. 5 is an illustration showing an example of identified content posted on the deep/dark web, according to embodiments of the present invention.

DETAILED DESCRIPTION

Methods, systems, and computer program products are provided to determine an individual's risk of being targeted by a cyberattack based on quantifying their online presence in terms of PII features present in one or more online data sources. PII features may include but are not limited to username, screen name, age, gender, ethnicity, address, city, state, ZIP code, military organization, unit, rank, clearance, housing cost or income, credit card number, political party affiliation, relatives, neighbors, colleagues, criminal record, phone number, Social Security number, usernames, passwords, etc. In general, any type of information used to identify an individual/entity may be considered a PII feature.

Figure 1:
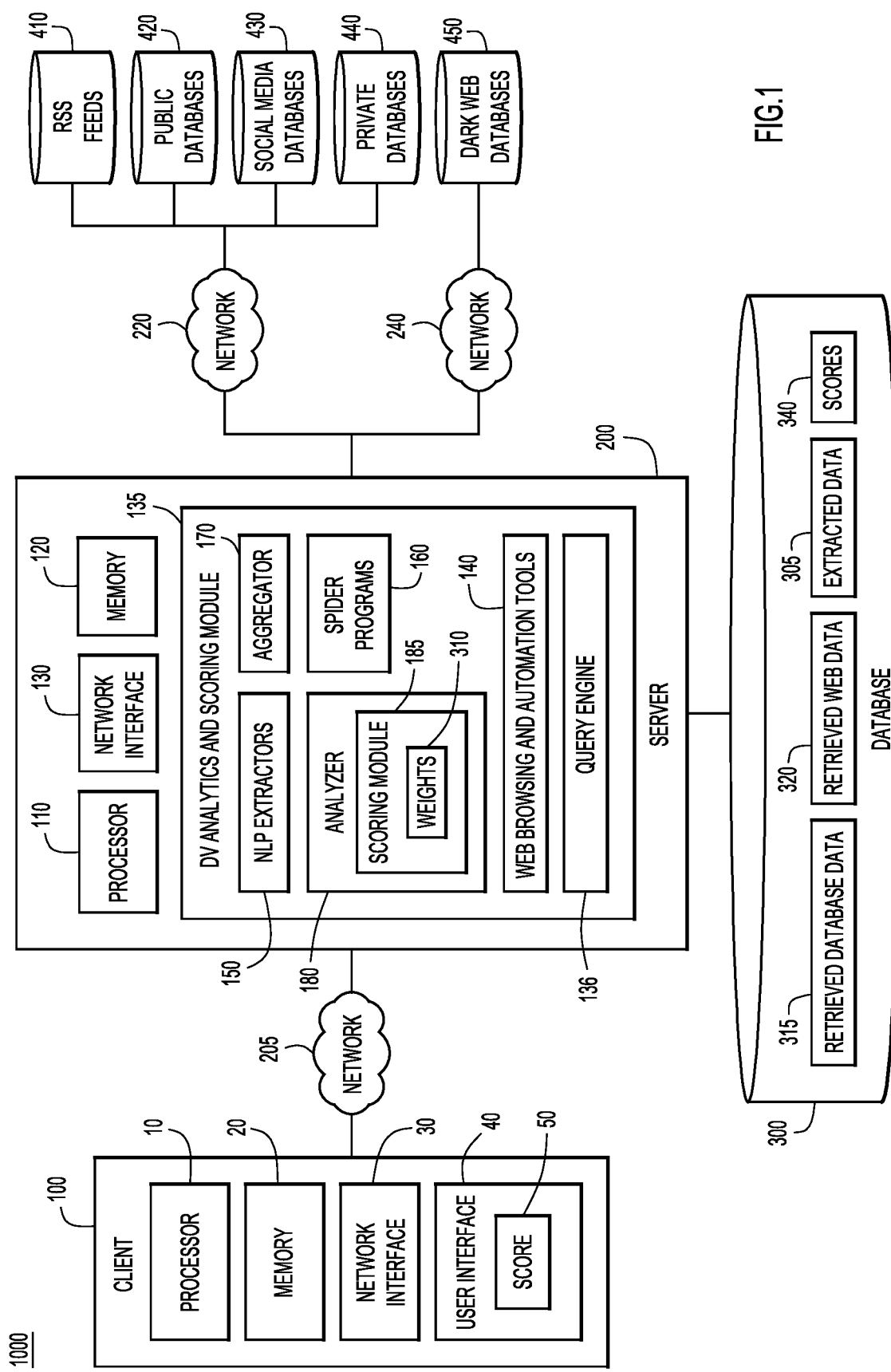
FIG. 1 is a block diagram illustrating an example architecture of a digital vulnerability assessment system, according to embodiments of the present invention.

With reference now to FIG. 1, a block diagram is shown of an example computing environment 1000 in which aspects of the embodiments provided herein may be implemented. The computing environment 1000 may include at least one end-user or client computer 100 and at least one server computer 200. Client computer 100 and server computer 200 may communicate over a network 205. Server computer 200 may also communicate with remote databases on the clear web (such as RSS feeds 410, public databases 420, social media databases 430, and/or private databases 440) via a network 220, with remote databases 450 on the dark web via a network 240, and with a local database 300. In an example embodiment, server computer 200 may be configured to implement a digital vulnerability (DV) assessment system.

In the example embodiment shown in FIG. 1, server computer 200 includes one or more processors 110 (e.g., a CPU, a GPU, a microprocessor, a microcontroller, a controller, etc.), a memory 120 (e.g., RAM, ROM, EPROM, flash, etc.), a network interface 130 (e.g., modem, network card, etc.), and a DV analytics and scoring module 135, which may generate a DV score 50. The DV analytics and scoring module 135 may include web browsing and automation tools 140, spider programs 160, query engine 136, natural language processing (NLP) extractors 150, aggregator 170, and analyzer 180 (e.g., including scoring module 185 and weights 310). DV analytics and scoring module may be stored in memory 120 or some other non-transitory computer readable medium.

Web browsing and automation tools 140 may facilitate the collection of content from public and private databases or other data sources for identification of PII features. Web browsing and automation tools 140 may include software to run automated searches on the web. Search engines such as Google® periodically crawl the public web to discover and index new webpages, as well as re-index previously existing webpages. To conduct an automated search, software (e.g., macros, programming languages capable of interfacing with the web, such as Python or Perl, or other custom software) may be used to conduct web searches on an ongoing basis by performing searches pertaining to specific individual names or other PII. The results may be downloaded to database 300 for storage and further analysis. In other aspects, a snapshot of the public web may be taken and downloaded to database 300, and the content may be indexed and searched by NLP extractors 150. In still other aspects, web browsing and automation tools 140 may conduct a live search for PII pertaining to an individual on the clear web. In some aspects, web browsing and automation tools 140 may communicate with data sources to obtain content (e.g., database records, structured data, unstructured data, videos, images, binary data, blobs, audio, etc.) comprising PII features, which may be stored in database 300 as unstructured retrieved web data 320. In other embodiments, web browsing and automation tools 140 may communicate with public and private databases to obtain PII features which may be stored in database 300 as structured retrieved database data 315. Web browsing and automation tools 140 may be configured to identify and obtain data pertaining to an individual or entity, or may be configured to identify and obtain data associated with a particular data source (e.g., all private database entries in a specific date range).

Spider programs or web crawlers 160 may crawl social media websites and/or the deep/dark web, copying content for analysis by NLP extractors 150 or to store on database 300 as retrieved web data 320. In some aspects, the spider programs or web crawlers 160 may copy entire data sources or databases on the dark web, provided that the size of the database is not too large, or may copy part of a database and may store the copied content on database 300. The content may be indexed and searched by NLP extractors 150. In some aspects, copied content may be aggregated, such that each subsequent copy of a data source is added to content that was previously copied. Thus, the spider programs or web crawlers 160 may periodically copy content from data sources, so that if previously captured content is removed from the dark web, the deleted content, if previously captured, will remain in database 300. In other aspects, to obtain content from the dark web, terms may be entered into a search interface available through a forum on the dark web. Results may be downloaded to database 300, indexed and searched by NLP extractors 150. In still other aspects, spider programs 160 may conduct a live search for PII pertaining to an individual on the dark web. Content obtained from spider programs or web crawlers 160 may be analyzed by NLP extractors 150, to identify and extract PII features from the online content. Extracted content may be stored as extracted data 305 (e.g., in a structured database, etc.). In some embodiments, spider programs capture all available information associated with a particular web domain. In other embodiments, spider programs are configured to harvest content associated with an individual/entity name, address, phone, fax, email address, etc. The content may be stored directly on database 300, or may be passed to NLP extractors 150 for analysis.

NLP extractors 150 may extract PII features from information gathered by spider programs 160 or from web browsing and automation tools 140. NLP extractors 150 may parse text or other unstructured content to identify and extract PII features. Retrieved web data 320 may also be analyzed by NLP extractors 150 to identify and extract PII features from the online content. NLP extractors may be capable of a variety of language processing techniques, including grammatical parsing, stemming, terminology extraction, semantics, language translations, extracting relationships between text (e.g., to determine who is related to whom, who is friends with whom, etc.), speech recognition, etc. To identify PII features, a training data set comprising examples of PII features may be provided to NLP extractors 150, and machine learning algorithms may be utilized to train the NLP extractors on identifying and extracting PII features. In still other embodiments, and for PII features that have a limited number of structural variations (e.g., such as social security numbers or credit card numbers having fixed characteristics—a specified number of digits with or without dashes at specified locations in the numerical string), regex expressions may be utilized to identify PII features. NLP extractors 150 may index and extract information stored on database 300.

Query engine 136 may receive inputs from a user to search data stored in database 300. In some aspects, the inputs are PII features corresponding to the identity of the individual or entity for which a DV score is to be generated. In some aspects, the same inputs provided to web browsing and automation tools 140 and spider programs 160 are provided to query engine 136. A query may be generated and used to search data stored on database 300. The query engine may search any of retrieved database data 315, retrieved web data 320, and/or extracted data 305, and may provide such identified data to aggregator 170 for further processing. In some embodiments, query engine 136 may generate, from query terms received by a user, queries to search particular sources of data. Data stored from a particular source (e.g., a public database, a private database, a social media database, a dark web database, etc.) may each be stored in a particular format, and in some aspects in a particular location, within database 300. Query engine 136 may adapt a user query to a particular data source, e.g., by translating the user query into a format which can be used to search data from a particular source stored in a particular format. In other embodiments, query engine 136 can adapt a user query to be compatible with searches performed using web automation programs 140 or spider programs 160, providing to the web automation or spider programs, terms which may be used to search for information pertaining to the user query.

Aggregator 170 may aggregate information from various data sources. For example, extracted PII features (e.g., extracted data 305, PII features obtained directly from the clear and dark web, etc.) may be obtained from social media databases 430, dark web sites and databases 450, RSS feeds 410, etc., and structured PII features may be obtained from public databases 420 or private databases 440 (e.g., retrieved database data 315, PII features obtained directly from the clear web, etc.). The aggregator may correlate the information from various data sources, such that PII features from each of the data sources specific to an individual is linked to that individual. In some aspects, aggregation may be based on a unique feature (e.g., a unique name, a social security number, etc.) In other aspects, aggregation may be based on a combination of PII features (e.g., two or more of a name, a phone number, an address, etc.), such that only content having both of these features may be aggregated.

Analyzer 180 may apply weights 310 to the aggregated PII features in order to generate a DV score, e.g., using scoring module 185. In some embodiments, scoring module 185 may comprise weights 310, which may be either set by a user or by default or by a machine learning algorithm, wherein the weights correspond to a feature strength of each type of PII feature and/or an association strength reflecting a number of levels/tiers. These modules are discussed in additional detail throughout the application and figures. Once generated, the DV score and corresponding reports may be presented to client 100 for display to the user.

Server 200 may include any number of computer processors or central processing units (CPUs) or graphical processing units (GPUs), any number of which may include one or more processing cores. In some embodiments, any of the processing cores may be physical or logical. For example, a single core may be used to implement multiple logical cores using symmetric multi-threading.

Client computer 100 may be a personal computer, a network computer, a tablet, a smartphone, or any computing device configured to communicate with server 200, and may be equipped with a display (e.g., a monitor, a touch screen, a LCD screen, or any physical or virtual interface to display content, etc.) for viewing information (e.g., DV scores, weights, tiers/levels of association, extracted PII features, etc.) as well as keyboards, mice, keypads, touch screens, or voice capture devices etc., for inputting information into DV analytics and scoring module 135 of server 200. Client computer 100 may also comprise commercially available software for operation of the computer (e.g., an operating system, updates, drivers, etc.) as well as server/communications software, browser/interface software for accessing both clear and deep/dark web sources, etc. Client 100 includes one or more processors 10 (e.g., a CPU, a GPU, a microprocessor, a microcontroller, a controller, etc.), a memory 20 (e.g., RAM, ROM, EPROM, flash, etc.), a network interface 30 (e.g., modem, network card, etc.), and a user interface 40. User interface 40 may be configured to display the output of the DV analytics and scoring module 135 (e.g., the DV score 50). User interface 40 may also be configured to communicate with server 200, to allow the user to configure various inputs (e.g., selection and weights of PII features, selection of data sources, input of query terms, entity/individual information for which a DV score is to be generated, etc.) for the DV analytics and scoring module 135. Thus, user interface 40 may be a graphical user interface (e.g., a GUI, a command line prompt, a menu screen, etc.) that prompts a user for information pertaining to the generation of the DV score, and may provide reports or other information pertaining to the results of the analysis, e.g., the DV score, tiers/levels of associations, identified and extracted PII features on the clear or deep/dark web, etc. Client computer 10 may be configured to communicate with server 200 via a web browser (e.g., by accessing a website hosted by a server), via a web browser plug-in, or via an application program running on the client computer.

Users may provide one or more PII features as input to DV analytics and scoring module 135 (e.g., to query engine 136, to web browsing and automation tools 140, to spider programs 160, etc.), which may search content from the clear web and the dark web and return results. One or more PII features corresponding to an individual may be known at the onset of generating a DV score (e.g., an individual's or entity's name). In some embodiments, a single PII feature is provided as input using user interface 40, while in other cases, multiple PII features may be provided as input. For example, an individual's name and age, or an individual's name and address may both be provided as input. By providing more than one PII feature to the query engine 136, false positives returned by the query engine may be decreased. For instance, if a search of an individual name returns multiple candidates, with each candidate associated with different ages, addresses, or titles, other known PII features (e.g., ages, addresses, or titles) may be used to select content corresponding to the individual of interest. Providing multiple PII features as inputs may improve the accuracy of content identified as corresponding to the entity or individual for which a DV score is being generated.

In some embodiments, known PII features (e.g., an individual's name) may be provided to spider programs 160, or to web browsing and automation tools 140 to identify relevant online content. In general, online content includes information available online (e.g., text, video, images, audio, etc.) and may contain one or more PII features. In other embodiments, spider program 160 or web browsing and automation tools 140 may copy content to database 300 for further analysis or may route content to NLP extractors 150 for extraction of PII features. In some embodiments, images (e.g., frames from a video, jpegs, gifs, etc.) may be analyzed using facial recognition technology to identify individuals in an image. Similarly, voice-to-text translators may be used to translate audio to text, and NLP extractors 150 can be used to analyze the translated text to identify references to the individual, as well as identify PII.

Thus, DV analytics and scoring module 135 may search online content at its respective online location for a search term (e.g., individual name, social security number, etc.) to identify content (e.g., other PII features) pertaining to the individual. This identified content may be provided to NLP extractors for extraction and storage of PII features or this content may be stored in its entirety in database 300. In other aspects, DV analytics and scoring module 135 may crawl through a data source and copy all content (not specific to a single individual or entity) to database 300 for later analysis. Thus, the embodiments presented herein generally apply to data stored in database 300 and/or to data at its respective online location.

Server 200 may be connected to a database 300, which may store various types of information for the analysis and determination of the DV score. For example, sources of retrieved web data 320 collected by spider programs 160, RSS feeds, and sources of retrieved database data 315 collected by web browsing and automation tools 140 may be stored in database 300. Additionally, NLP extractors 150 may identify and extract PII features from retrieved web data 320 and retrieved database data 315 (if not already in a structured format), the output of which may also be stored in database 300, e.g., as extracted data 305. DV scores 340 from past analyses may also be stored, allowing changes in an individual's DV score to be tracked as a function of time. The database may be implemented by any conventional database unit or storage unit, or equivalent, may be local to or remote from the server 200, and may communicate with the server 200 through any suitable medium (e.g., wire, cable, wireless, LAN, WAN, Internet, Intranet, VPN, etc.).

Server 200 may access information stored on the clear web, e.g., RSS feeds 410, public databases 420, social media databases 430, private databases 440, e.g., via network 220. Server 200 may access information stored on the dark web, e.g., dark web databases 450, via network 240. Although not shown in FIG. 1, network 240 may include a proxy server for access to the dark web (see also, FIG. 3). Networks are mediums through which various devices and computers communicate with each other through links (e.g., including but not limited to wired communication links, wireless communication links, fiber optic communication links, etc.). With regard to client 100, it is understood that client 100 is a client to server 200 in this example, and that client 100 and server 200 may be local to or remote from each other.

Client 100 may be connected to server 200 via any suitable communication network 205 including e.g., the Internet, the Intranet, a wide area network (WAN), a local area network (LAN), a wireless link, hardwire, a VPN or a modem. In general, server 200 is remote from each of the data sources RSS feeds 410, public databases 420, social media databases 430, private databases 440 and dark web databases 450. Server 200 may access the data sources via any suitable communication network including, e.g., the Internet, a wireless link, hardwire, a VPN, etc.

Server 200 may be local to or remote from database 300. Server 200 may access database 300 via any suitable communication network, including e.g., the Internet, the Intranet, a wide area network (WAN), a local area network (LAN), a wireless link, hardwire, a VPN. Database 300 may be attached to the network, e.g., network attached storage, cloud based data storage system, or other remote storage.

In some embodiments, the digital vulnerability assessment system may be configured to operate as a standalone unit on a client computer, such that the client computer 100 has access to database 300 and RSS feeds 410, public databases 420, social media databases 430, private databases 440 and dark web databases 450, and includes the DV analytics and scoring module 135 (e.g., web browsing and automation tools 140, natural language processing (NLP) extractors 150, spider programs 160, query engine 136, aggregator 170, and analyzer 180 (including scoring module 185). The standalone unit may compute the DV score 50, according to the techniques described herein.

Figure 2:
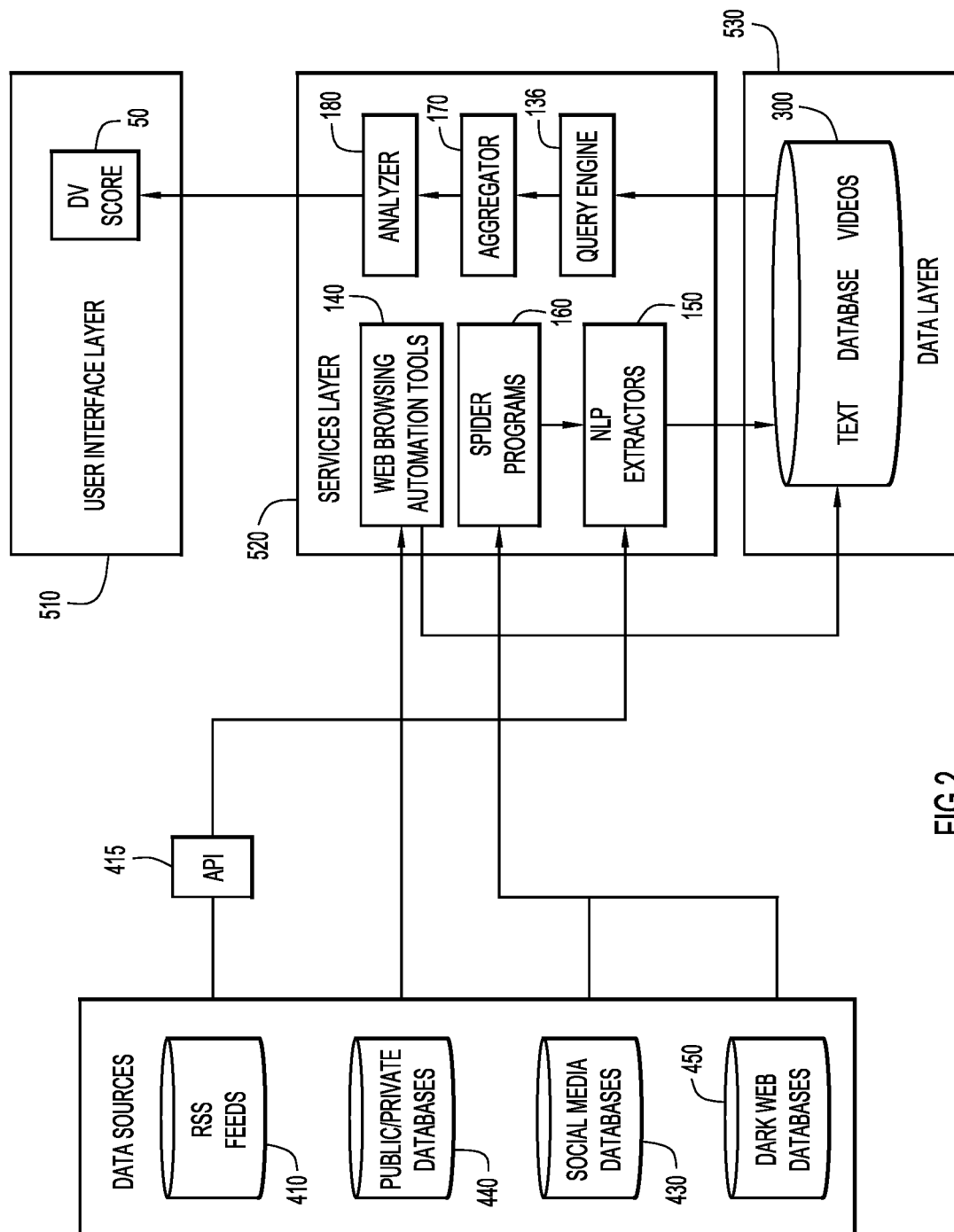
FIG. 2 is a block diagram illustrating application layers of a digital vulnerability assessment system, according to embodiments of the present invention.

FIG. 2 is an illustration of example application layers of the DV analytics and scoring module 135, showing data flow through the application layers and with various data sources. For example, data sources include but are not limited to RSS feeds 410, public/private databases 420/440, social media databases 430, and dark web databases 450. Each of these types of databases are accessible by various modules in services layer 520. Services layer 520 may serve the dual purpose of providing APIs to obtain content from various data sources, and providing the obtained content to the data layer 530. Services layer 520 may also extract PII features (e.g., PII feature extraction from documents or webpages, including text based analysis, facial recognition of images or video, voice recognition from videos or audio files, etc.) to represent the PII features as quantifiable artifacts.

Web browsing and automation tools 140 may access public databases 420 and private databases 440. In some embodiments, the public or private database may be a relational database or a non-relational database. Relational databases may include Microsoft SQL Server, Oracle Database, MySQL, and IBM DB2, while non-relational databases referred to as NoSQL databases may include MongoDB, DocumentDB, Cassandra, Coachbase, HBase, Redis, Neo4j, etc. The web browsing and automation tools 140 may return relevant data from the data sources, and the retrieved content may be stored in database 300 (e.g., retrieved database data 315) in data layer 530 for subsequent aggregation and analysis. For example, in some aspects, a database having a front-end web interface may be accessible over the web. To access the data, web browsing and automation tools 140 may be used to enter terms into a search engine that interfaces with the back-end database, and the results may be downloaded. In other aspects, the database may be directly accessed, e.g., through a port. The type of database, whether relational or non-relational, may be determined a priori, and the web browsing and automation tools 140 may be configured to interact directly with the particular type of database. A variety of software tools are available for extracting the content of databases, or alternatively, custom software may be developed to access the databases. Content may be downloaded in a manner that maintains relationships between objects in a database. In other embodiments, for commonly used database structures, such as MySQL, Oracle, DB2, etc., the web browsing and automation tools may include adapters that interface with these commonly used types of databases. Configuration information allowing web browsing and automation tools to select an appropriate adapter to access the public or private database and to format the search results may be provided to the web browsing and automation tools.

Spider programs 160 may be used to crawl dark/deep web sources (e.g., dark web databases 450) and/or social media sources (e.g., social media databases 430) to provide content to NLP extractors 150 for further analysis or may copy the content of the data source to database 300 for subsequent indexing and/or analysis by the NLP extractors 150. In general, when content is passed through NLP extractors, PII features are extracted and saved, while other content is discarded. In some aspects, content (e.g., text, videos, images, links, audio, etc.) returned from spider programs 160 may be stored in database 300 as retrieved web data 320 for further analysis. In some embodiments, images (e.g., frames from a video, jpegs, gifs, etc.) may be analyzed using facial recognition technology to identify individuals in an image. Similarly, voice-to-text translators may be used to translate audio to text, and NLP extractors 150 can be used to analyze the translated text to identify references to the individual, as well as PII. In some aspects, spider programs 160 may capture rendered content of the web page which includes content that may not be available through the source code of the webpage.

NLP extractors 150 can extract information from RSS feeds 410 and from the data collected by spider programs 160 as well as data stored in database 300. In some embodiments, an application programming interface (API) 415 may be utilized to access the RSS feeds. In general, NLP extractors may be configured to identify and extract PII features from content by recognizing characteristics of each type of PII feature. For example, the NLP extractors 150 may be configured to identify and extract a social security number, name, or any other suitable PII feature. NLP programs may be configured based upon observation-based heuristic rules or machine learning techniques that utilize statistical models to classify data to identify PII features.

For example, NLP extractors 150 may be configured to analyze retrieved web data 320 and unstructured retrieved database data 315 to identify and extract PII features such as names, social security numbers, rank, address, etc., and this content may be stored as extracted data 305 on database 300 for ease of subsequent access.

Aggregator 170 may aggregate the various types of information stored in database 300 such that PII features for an individual or an entity are aggregated into a single record, e.g., a record containing for an individual, all PII features from all data sources, including PII features from social media sources, public and private databases, RSS feeds, and dark/deep web databases 450. For example, NLP extractors 150 may identify and extract PII features from information obtained from different data sources. After extraction, separate data sets may be present for each data source, corresponding to PII features extracted from FACEBOOK®, from TWITTER®, from LINKEDIN®, from a public database, from a private database, from the dark/deep web, etc. In some embodiments, the aggregator may identify a unique PII feature common to each data source (e.g., a unique name), and may aggregate data based on this unique feature. In other embodiments, the aggregator may identify a unique PII feature common to two data sources, and may aggregate data for the two sources. Once aggregated, the aggregator may search for additional common PII features within the remaining data sets, and the process may repeat. In other embodiments, the aggregator may utilize machine learning or other statistical models to correlate PII features, e.g., extracted from social media/dark web sources with PII features from a private/public database. For example, if an age of an individual is not explicitly known from the social media data, but is known from the private database, a machine learning model may be utilized to classify social media feeds based on age. An individual in their 60's or 70's may have a social media feed of different (age-indicating) content than an individual of the same name in their teens. Such machine learning models may be used to make decisions regarding when content from disparate data sources may be combined.

Once the PII features have been aggregated, analyzer 180 may access data from aggregator 170. The aggregated data may be stored in database 300 for ease of subsequent access, and may be updated with new PII features from ongoing searches. Analyzer 180 may apply weights 310 to each PII feature, wherein the weights include a weight corresponding to PII feature strengths and association strengths, to compute a DV score 50, which may be provided to the user interface layer 510 for display on the client device 100. In some embodiments, the DV score may be a cumulative score, wherein the magnitude of the DV score increases relative to the number of PII features and their corresponding feature strengths. In this embodiment, as the number of PII features found online increases, the DV score also increases. High DV scores may reflect a large number of PII features with high feature strengths. In other embodiments, an alternative weighting scheme may be used, in which lower feature strengths correspond to features likely to be unique (e.g., a social security number would receive a low feature strength, whereas a political party would receive a high feature strength). In this example, a low cumulative DV score may indicate a high number of unique PII features found online. Many different types of weighting schemes may be utilized with present embodiments.

Data layer 530 may comprise database 300, which contains text in structured or unstructured form as well as videos, images, audio recordings, or other types of content comprising PII features. In some embodiments, the data layer comprises a NoSQL database, which stores text data and downloaded artifacts, such as images and videos. In other embodiments, the data layer comprises an SQL database, e.g., storing text data extracted from NLP extractors 150. In some aspects, PII features (e.g., a name) may be entered using the user interface layer 510 to be provided to query engine 136 to be searched against data stored in database 300.

Therefore, in an embodiment, user interface layer 510 may correspond to applications or services residing on client system 100 (allowing the end user to interact with the data through applications that are viewed in a dynamic web-based user interface), services layer 520 may correspond to applications or services residing on server 200, and data layer 530 may correspond to applications residing on database 300. Thus, the DV score may be generated from data flowing through a multi-layer process, comprising a user interface layer 510, a services layer 520, and a data layer 530.

Figure 3:
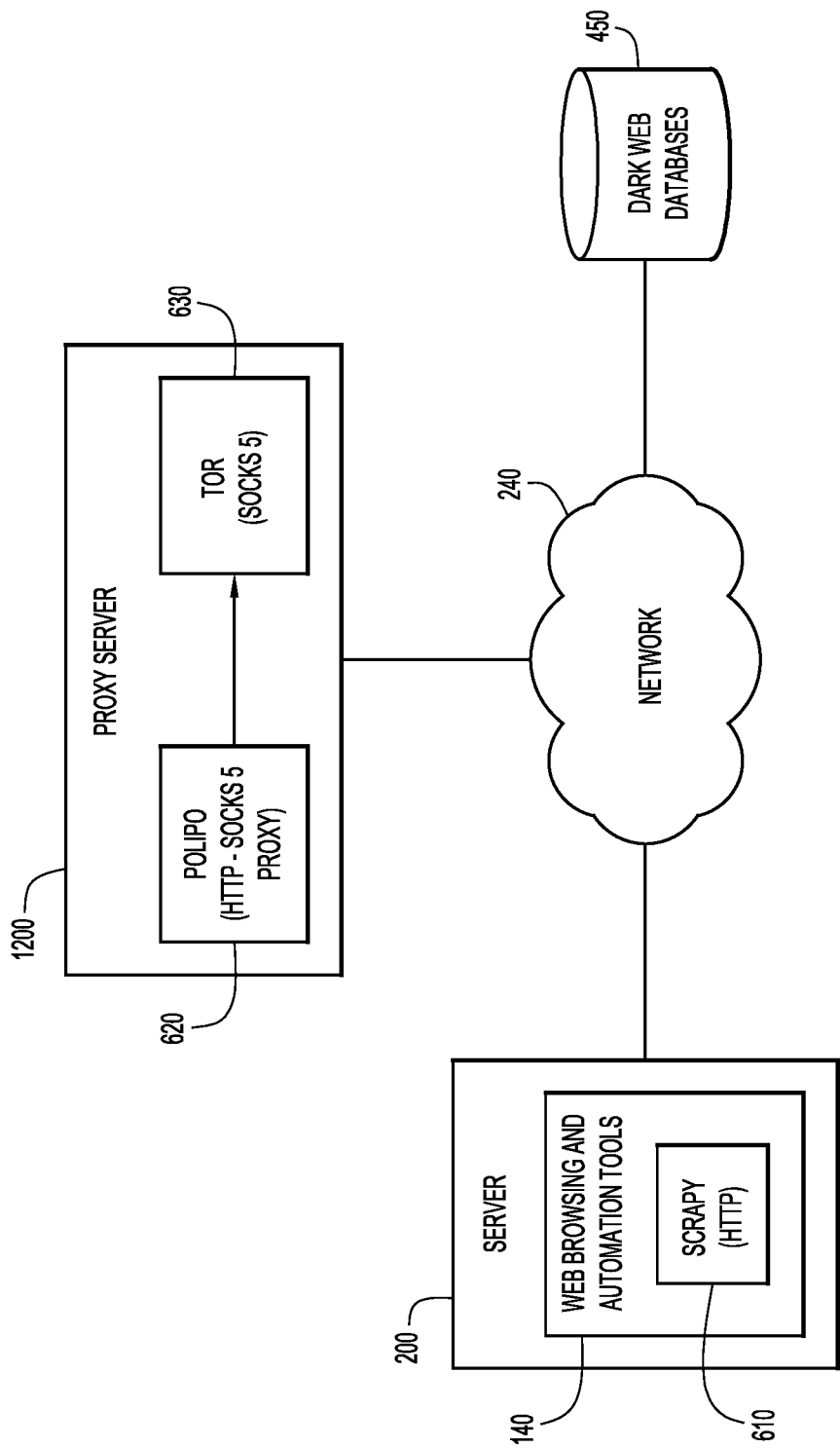
FIG. 3 is a block diagram illustrating an example architecture of a server configured to access the deep/dark web, according to embodiments of the present invention.

FIG. 3 shows another schematic of server 200 and a proxy server 1200 configured to access the dark web. The dark web is part of the interne that generally needs encrypted browsers (e.g., a Tor browser) and cannot be indexed using popular search engines, such as GOOGLE®. As such, current social influence scores are limited to clear web resources, such as the Internet.

To access data on the dark web, spider programs 160 (e.g., web crawlers) may be utilized. In some embodiments, the spider program may be based on an open source framework configured to scrape content from websites, e.g., Scrapy, etc., which may be configured to read and copy each field of a website's HTML code. Each spider program may be custom designed for each dark/deep website, as each website may have been created with its own design rules and functionality. Dark web data may be posted by users on forums, which typically have limited functionality (e.g., displaying posts, identifying authors, generating and displaying user statistics). To create a new forum, web designers often modify a previously designed forum template. As a result, creating a new spider program to crawl newly created forums on the deep/dark web can often be derived from a same or a similar template used to crawl an existing forum, as minimum changes to the existing spider program code are often needed.

Rather than forming a direct user connection, and consequently revealing the source/destination IP addresses of the client 100, a proxy server (e.g., running a Tor browser) may be utilized to access the dark web. In general, proxy servers may randomly bounce network traffic between other proxy servers, while maintaining multiple layers of encryption, allowing users to maintain anonymity, which is attractive to cyber criminals.

The commands to read and collect website content (e.g., Scrapy) are based on an HTTP protocol. To bridge the communication gap between the HTTP protocol and the Tor browser, which may utilize a protocol such as SOCKS 5 to access the dark web, a proxy server 1200 running web proxy software, which may generate a web cache (e.g., Polipo 620, may be utilized. Polipo 620 allows commands from Scrapy 610 to be received by the Tor browser 630 as shown in FIG. 3. In this example, Polipo 620 translates HTTP commands to SOCK 5 commands, which are provided to Tor browser 630. Access to the dark web may be obtained through the Tor browser, which encrypts transmitted data between users through a network of relays.

In some embodiments, the digital vulnerability assessment system 1000 may utilize the following algorithm to generate a DV score:

$$VS_{(i,j)}(u,T) = f(u, d_{(i,j)}) \cdot w(d_{(i,j)}) \qquad (1)$$

$VS_{(i,j)}(u,T)$ represents the vulnerability score, where u corresponds to the individual, T corresponds to a period T over which the function is to be evaluated, and $d_{(i,j)}$ represents the $i^{th}$ level in the hierarchy (e.g., i=0 for the topmost level, also referred to as direct association) for the $j^{th}$ data source (e.g., social media databases, public databases, private databases, dark web databases, etc.).

For a given individual or entity of interest, each PII feature may be represented as a data source feature vector f (u, $d_{(i,j)}$), which may be represented as a binary function with the value "0" if the particular PII feature (e.g., a phone number) is not found at the $i^{th}$ level in the hierarchy at the $j^{th}$ data source, and with the value "1" if the particular PII feature (e.g., a phone number) is found at the $i^{th}$ level in the hierarchy at the $j^{th}$ data source. Thus, each data source may be represented as a mathematical vector and each PII feature may be represented as a feature vector normalized to either 0 or 1, meaning the PII feature either is or is not revealed in the data source.

Each data source feature vector may be weighted by a weight vector $w(d_{(i,j)})$. The weight vector may be a weighting factor determined by any one or more of the following: (1) a PII feature strength, which reflects the level of importance assigned to a PII feature; (2) an association strength, which is based on the number or levels/tiers of associations between PII features. As an example, a PII feature which is unique to an individual, e.g., such as a social security number, may have a high PII feature strength (e.g., 5), while a PII feature which may apply to many individuals, e.g., a gender, may have a low PII feature strength (e.g., 0.2). The association strength reflects whether a PII feature is revealed directly from a data source (direct association), from a secondary data source (second tier), from a tertiary data source (third tier), or higher, and may decrease for each additional tier needed to form an association.

An association strength reflects a level of association corresponding to which level of the $j^{th}$ data source the PII feature may be found. For example, if a GOOGLE® search in which an individual name is the query returns the phone number of the individual, the $i^{th}$ level is considered to be a direct association, and the association strength may be assigned a high value (e.g., a value of 1). For a GOOGLE® search that returns information associated with an intermediate result, the association strength may be assigned a value less than a direct association (e.g., a value of 0.5), reflective of a lower association strength, and so forth.

In some embodiments, the vulnerability risk score may be calculated as the L2 normalization of the vector generated by the product of the data source feature vectors and weight vectors:

$$VS_{(i,j)}(u,T) = \|f(u, d_{(i,j)}) \cdot w(d_{(i,j)})\| \qquad (2)$$

which may be normalized between 1 and 100 for a period T.

As an example, for a search of "Gabriele Caroline Smith", in which a phone number is directly returned by a web search, a social security number and credit card number is directly returned on the dark web, no information is returned by Twitter and an address is returned by Facebook linking to a public database, the DV score may be computed as:

$$DV = \sqrt{((1) \cdot (3 \cdot 1))^2 + ((1) \cdot (5 \cdot 1))^2 + ((1) \cdot (3 \cdot 1))^2 + (0)^2 + ((1) \cdot (3 \cdot 0.5))^2}$$

In some aspects, a weight to the data source is not added, based on the assumption that identifying PII features is equally important from any source regardless of whether it is found on a clear web or deep/dark web data source. In other aspects, an additional weight may be added to the data source if the data source is determined to not be of the same importance as the other data sources, e.g., for a data source considered to be more important, this data source may have a higher weighting than a data source considered to be less important. For example, in some embodiments, the value of the PII feature is weighted based upon the data source (e.g., FACEBOOK®, TWITTER®, etc.) from which the PII feature is derived. In general, data sources deemed to be more reliable may have higher weights than data sources deemed to be less reliable.

Thus, in some embodiments, the DV score is a weighted accumulation of PII features distributed in various data sources throughout the clear and deep/dark web. In this example, as the DV score increases, so does the risk of being targeted for a cybercrime. Datasets from any online resource may be subject to feature extraction for generation of the DV score. A table of example features and corresponding weights may be found in FIG. 4.

Referring to FIG. 4, example weights for association strengths and feature strengths are provided. In some embodiments, weights for feature strength may range between 0.2 and 5 based on the level of importance for a PII feature as defined by the user. Both weights for feature strength and association strength values can be adjusted heuristically per score result.

Once PII features (e.g., name, SSN, phone number, address, title, age, gender, etc.) are identified and extracted, different levels of associations may be generated, e.g., first tier (direct association), second tier, third tier, etc. Associations reflect relationships between features.

In this example, a search is performed for an individual with a first name and last name, shown as "FirstName #0 LastName #0". A first tier (direct association) shows an association between an individual name and the phone number of the individual name. First tier or direct associations reference data that is returned directly from the result of a search, e.g., searching for "FirstName #0 LastName #0" returns the individual's phone number directly using GOOGLE®. A link to another data source (a tier association which leads to an inference of a relationship) is not needed to establish a connection between the PII feature and the query term.

A second tier shows a single association (via an associate on FACEBOOK®) between an individual name (e.g., First-Name #0 LastName #0) and "Friends named LastName #0". As the associate has contacts on a social media platform, a connection can be inferred between the individual name and the associate, and between the associate and the additional contacts (e.g., Friends named LastName #0). Third tier connections can be formed using two links, in a similar manner.

In some embodiments, weighting decreases as tiers/levels of association increase. A strong association, such as a first tier association, may indicate a direct association of the PII feature (e.g., from a GOOGLE® search, 'the individual's phone number is XXX-XXX-XXXX') and may be associated with a higher weighting (e.g., 1). Second and third tier associations may have lower association strengths as these associations are based on inferences. As previously discussed, a second-tier association may involve a Google Search of the individual name "FirstName #0 LastName #0," which leads to a Facebook page of an associate, which references 'Friends named LastName #0'. However, additional investigation is needed to confirm the association, namely whether 'Friends named LastName #0' refers to FirstName #0 LastName #0'. Thus, an association strength (weight) for a second tier association may have a lower value, e.g., 0.5, than for a first tier association, as additional validation is needed. Similarly, third tier associations may reveal more query results ('Relatives named LastName #0'), but also necessitate additional investigation to verify the association. Thus, in some embodiments, increasing the tier of association (e.g., from first tier, to second tier, to third tier, and so forth) is correlated with a corresponding decrease in the association strength (e.g., from 1, to ½, to ¼ and so forth). In some embodiments, multi-tiered associations that reveal additional PII features are validated. Once validated, association strength may be adjusted upwards to reflect a higher weighting.

FIG. 5 shows an example of data including PII features (e.g., phone number, military affiliation, rank, clearance, phone number) for eight individuals that were revealed on the dark web. To determine whether additional PII features can be identified from other data sources, names of individuals shown in FIG. 5 can be selected as query inputs for digital vulnerability assessment system 1000 to determine whether additional associations or PII features can be obtained from additional clear web or dark web data sources, to assess individual risk of being targeted for a cybercrime (see also, FIG. 6).

In the example shown in FIG. 5, PII features from eight military personnel (i.e., FirstName #1 LastName #1, First-Name #2 LastName #2, FirstName #3 LastName #3, First-Name #4 LastName #4, FirstName #5 LastName #5, First-Name #6 LastName #6, FirstName #7 LastName #7, and FirstName #8 LastName #8) obtained from a deep web/dark web site e.g., viewable using a Tor browser (see, FIG. 3), are shown. The capability of the digital vulnerability assessment system 1000 to identify PII features from dark web sources and from various clear web resources (e.g., the NUVI® social media aggregator, GOOGLE®, FACEBOOK®, INS-TAGRAM®, TWITTER®, RESIDENT DATABASE®, NUWBER®, PEOPLE FINDERS®, COUNTY CLERK®, SPOKEO®, HOMEMETRY®, REDDIT® and PASTEBIN®) and public databases is demonstrated below.

Figure 6:
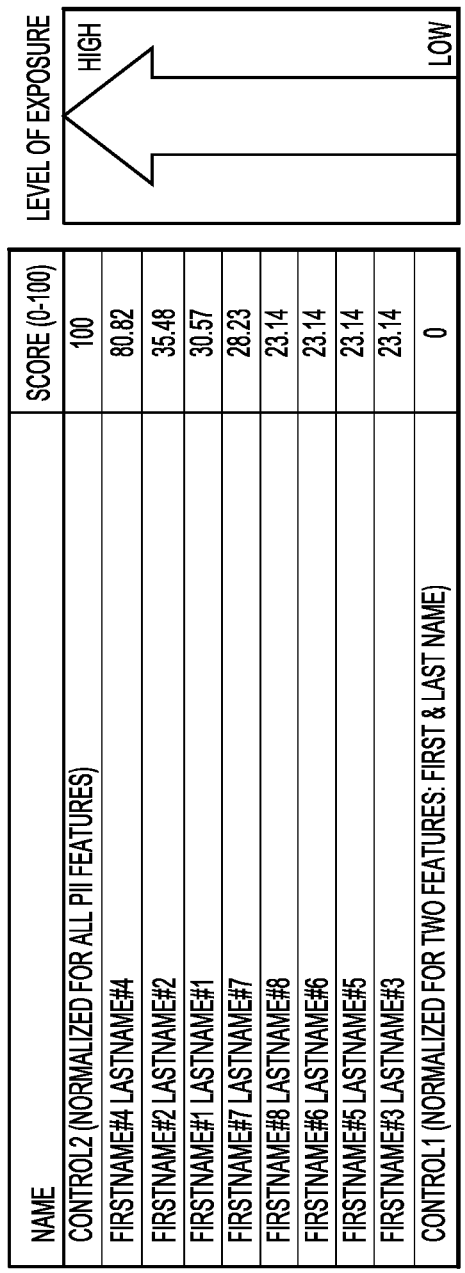
FIG. 6 is an illustration showing an example determination of DV scores for individuals by the digital vulnerability assessment system, according to embodiments of the present invention.

FIG. 6 shows an example output of the DV analytics and scoring module 135, wherein individual names are ranked according to DV score. A higher DV score indicates that more PII features of higher weights were identified indicating a higher risk of being targeted for a cyberattack. A lower DV score indicates fewer PII features of lower weights were identified indicating a lower risk of being targeted for a cyberattack. Using the individuals shown in FIG. 5, and adding two control names (e.g., Control 1 and Control 2) to establish normalized values for 0 and 100, it can be seen that except for the individual named FirstName #4 LastName #4, all individuals revealed in the Dark Web post in FIG. 5 maintained low DV scores (e.g., scores below 50).

Figure 7:
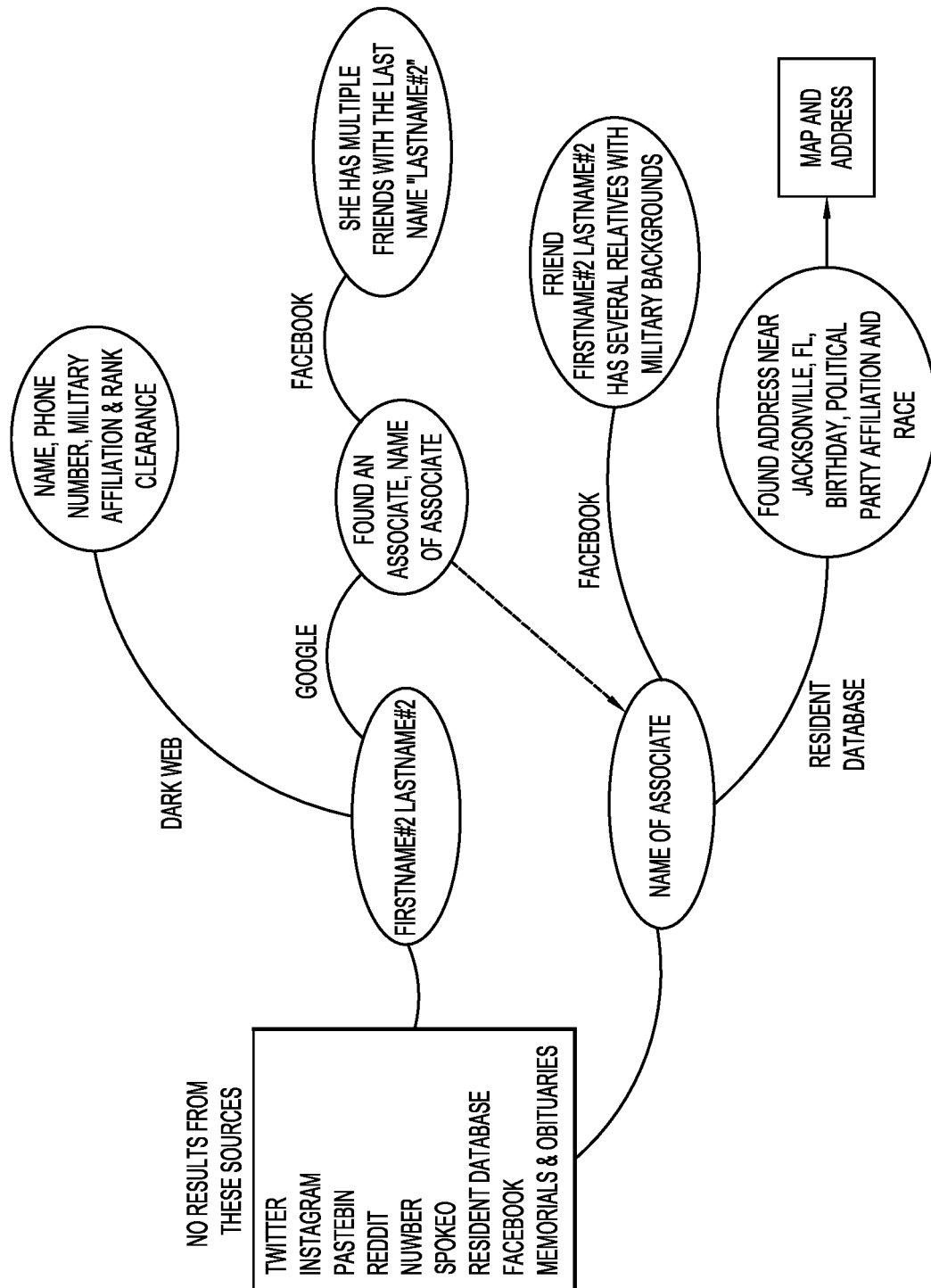
FIG. 7 is an illustration, showing examples of identified PII features by the digital vulnerability assessment system, according to embodiments of the present invention.

FIG. 7 shows an example graphical representation of a PII search that was performed on an individual named "First-Name #2 LastName #2" whose name was mentioned in the dark web post. Ten Clear Web data sources revealed no PII results for "FirstName #2 LastName #2", while two levels of searches revealed indirect associations. Using a GOOGLE® search of the phone number, an associate, was discovered that lives in Florida, the same location as "FirstName #2 LastName #2". From the associate's Facebook page, multiple links were found to multiple friends with the last name "LastName #2" who may be relatives of "FirstName #2 LastName #2". However, a direct association, e.g., a direct friend link, to a "FirstName #2 LastName #2" page was not found.

Figure 8:
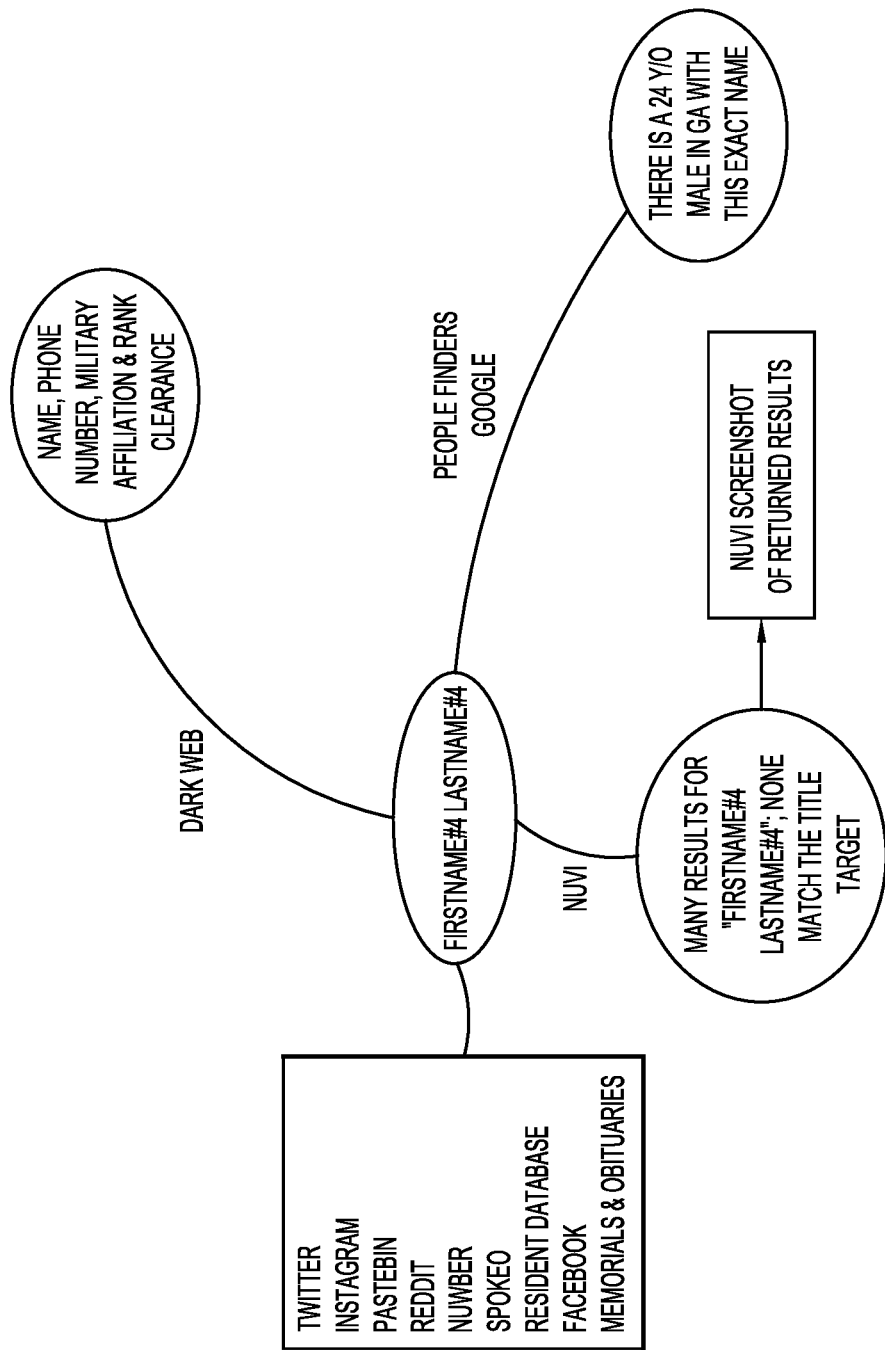
FIG. 8 is an illustration showing examples of identified PII features by the digital vulnerability assessment system, according to embodiments of the present invention.

FIG. 8, shows another example graphical representation of a PII search that was performed, in which the target was "FirstName #4 LastName #4". This search revealed a 24-year-old male in Georgia with the exact name. In this example, multiple "FirstName #4 LastName #4" posts were discovered when aggregating data, but none of the individuals matched the target individual.

Figure 9:
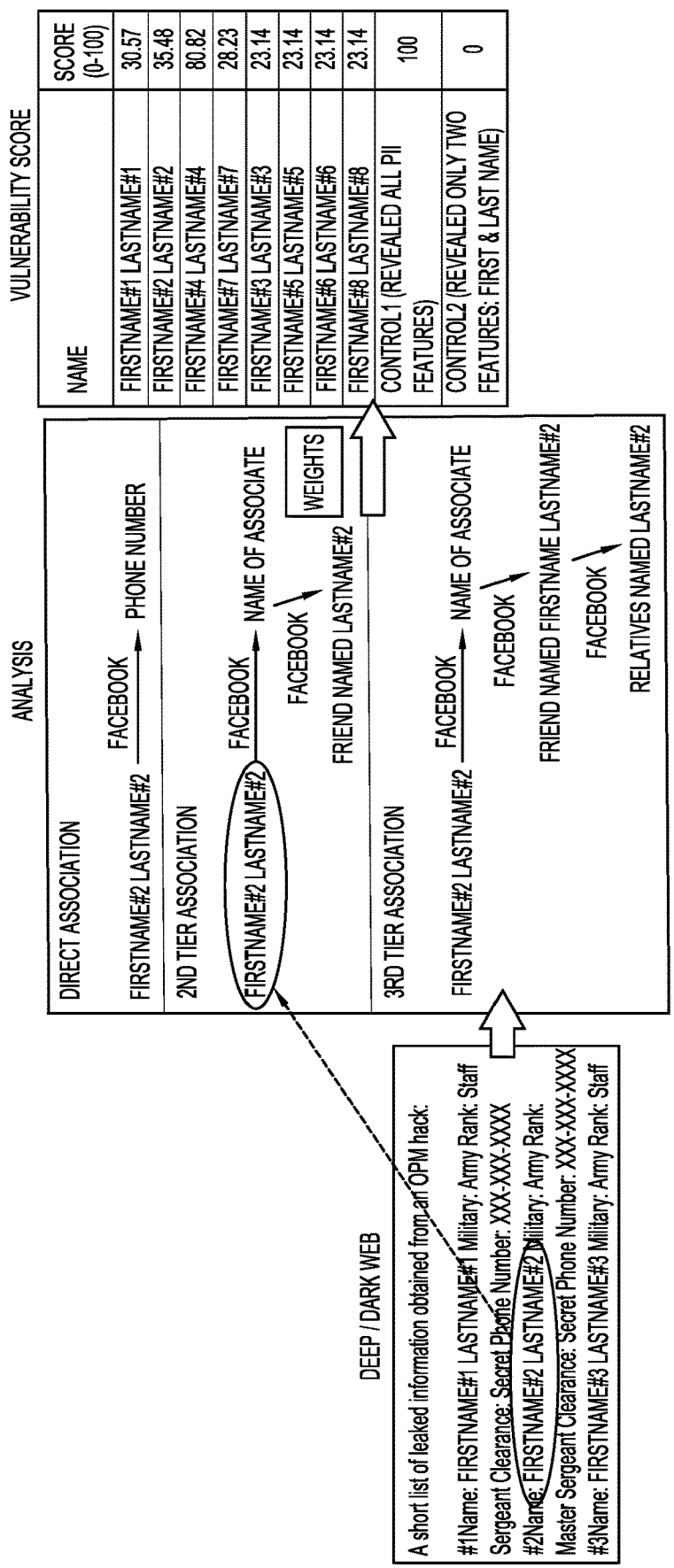
FIG. 9 is an illustration of a workflow showing extraction of PII features identified from data sources, aggregation and weighting of the extracted PII features, and determination of a vulnerability score, according to embodiments of the present invention.

FIG. 9 shows an illustration of an example workflow for generating the DV score, which is based on the number of PII features extracted from deep/dark web and clear web resources, as well as the number of associations between the queried name and PII features from web resources, e.g., other names mentioned in social media posts.

In this example, an individual name is selected for analysis and generation of a DV score. In some embodiments, text may be parsed by the NLP module to identify names of individuals. However, any suitable PII feature may be selected for analysis and generation of a DV score, e.g., a SSN, or a combination of suitable PII features may be selected.

Text may be identified on the deep/dark web that includes the individual name. For example, content (e.g., text content, image content, video content, voice content, etc.) may be identified on the deep/dark web by a spider program, e.g., Scrapy, or a modified version of a spider program (e.g., an existing spider program modified to crawl a forum on the deep/dark web. As forums are often created by modifying an existing template, an existing spider program may be adapted to crawl the specific form of the forum). Clear web resources may also be searched for the individual name and combined with the extracted data from the deep/dark web. In some embodiments, a PII feature may be associated or tagged with the source from which the feature was identified. In other embodiments, data stored in database 300 can be stored in particular repositories that indicate the origin of the data.

In other embodiments, the DV score may be determined based upon text embedded in videos and/or images. Multimedia artifacts may be posted within online content, revealing PII features, e.g., friends, relatives, location, gender and ethnicity. By extracting PII features from images and videos and associating the features with the individual, these features can be factored into the DV score. Associating embedded text with an image may be difficult in cases in which multiple people are in an image or video, unless the association is explicitly written in the message (e.g., 'Joe and Mark are at the beach'). Additionally, videos and images may not contain the individual's name if shared by another party. In such cases, a facial recognition module in the DV analytics and scoring module may be utilized to validate the identity of a person in an image so that the analyzer may form a correct association, e.g., by comparing a verified image of the individual with a candidate image.

Figure 10:
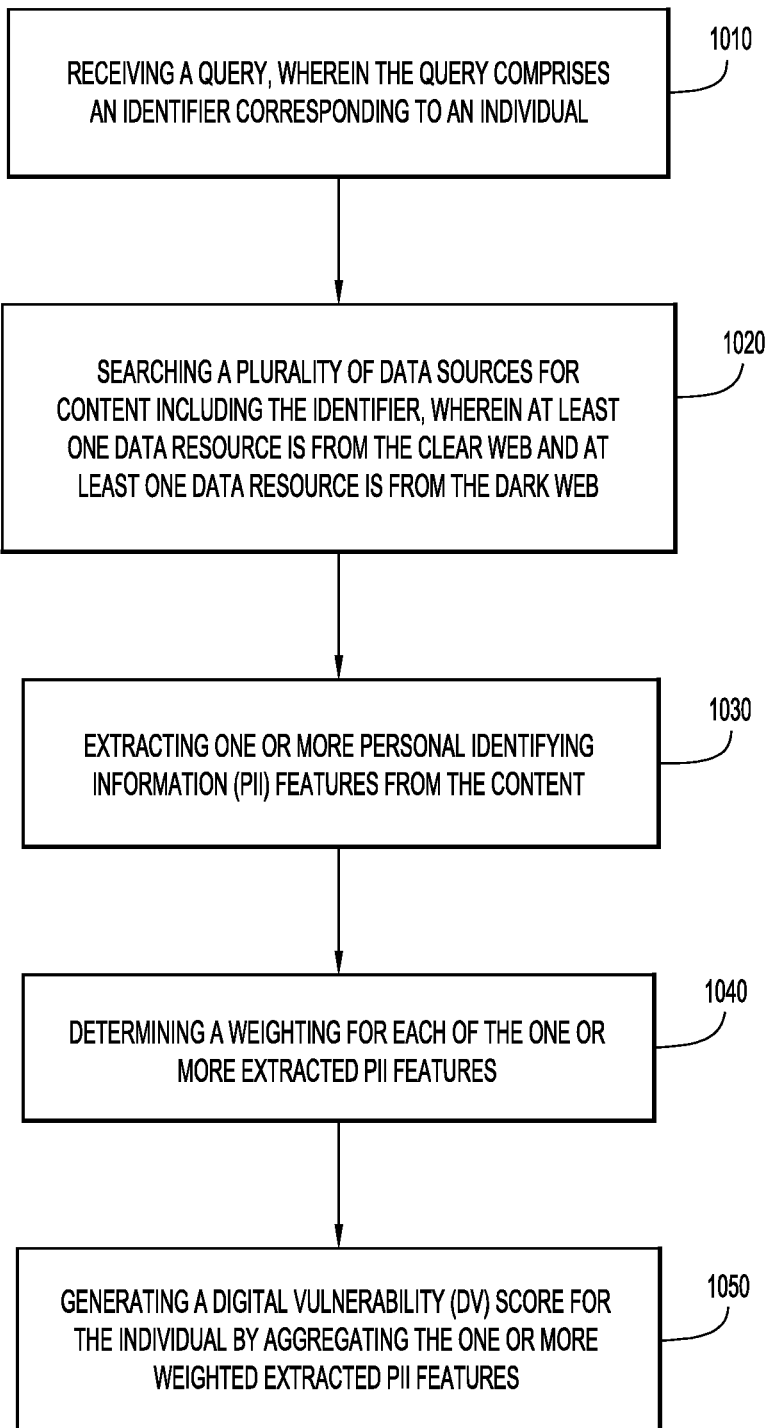
FIG. 10 is a flowchart showing exemplary operations at the server device, according to embodiments of the present invention.

FIG. 10 shows example operations of the digital vulnerability assessment system according to embodiments of the invention. A query is received at operation 1010. For example, query engine 136 may receive a query from client 100 over network 205 to search data stored in database 300. The query may comprise an identifier (one or more PII features) corresponding to an individual.

At operation 1020, a plurality of data sources is searched for content including the identifier, wherein at least one data resource is from the clear web and at least one data resource is from the dark web or deep web. For example, query engine 136 may search any of retrieved database data 315, retrieved web data 320, and/or extracted data 305, and may provide such identified data to aggregator 170 for further processing. In some embodiments, a real-time search of sources available on the clear and dark web may be initiated in response to a query. Such a search could generally be targeted to all data sources, or may be targeted to particular sources of data. For example, if a clear or dark web source is known to have information pertaining to a particular individual, the digital vulnerability assessment system may access those particular sites to determine if more recent information pertaining to the individual is present. In other examples, a hybrid search may be performed, in which the live public and dark web data sources as well as stored data sources on database 300 are both searched. For example, if stored (copied) data pertains to a data source that has aged beyond a threshold date (e.g., stored data is more than 30 days old), then server 200 may initiate a live search of the data source to obtain current data. In other embodiments, for data sources that are too time consuming to search live, or for data that has not yet aged, data stored on database 300 may be searched. Here, data sources that are relatively small may be targeted for a live search, when the results may be returned in a suitable timeframe. In still other examples, server 200 may search stored data on database 300, in order to return results quickly.

At operation 1030, one or more personal identifying information (PII) features from the content are extracted from the plurality of data sources. For example, NLP extractors 150 may extract PII features from data, which is provided to aggregator 170 for aggregation of the extracted data. NLP extractors 150 may parse text or other unstructured content to identify and extract PII features. NLP extractors may be capable of a variety of language processing techniques, including grammatical parsing, stemming, terminology extraction, semantics, language translations, extracting relationships between text (e.g., to determine who is related to whom, who is friends with whom, etc.), speech recognition, etc. To identify PII features, a training data set comprising examples of PII features may be provided to NLP extractors 150, and machine learning algorithms may be utilized to train the NLP extractors on identifying and extracting PII features. In still other embodiments, and for PII features that have a limited number of structural variations (e.g., such as social security numbers or credit card numbers having fixed characteristics—a specified number of digits with or without dashes at specified locations in the numerical string), regex expressions may be utilized to identify PII features.

At operation 1040, a weighting for each of the one or more extracted PII features is determined (e.g., by analyzer 180). For example, each data source may be represented as a mathematical vector and each PII feature may be represented as a feature vector. Each data source feature vector may be weighted by a weight vector or weighting factor determined by any one or more of the following: (1) a PII feature strength, which reflects the level of importance assigned to a PII feature; and/or (2) an association strength, which is based on the number or levels/tiers of associations between PII features.

At operation 1050, a digital vulnerability (DV) score may be generated for the individual by aggregating the one or more weighted extracted PII features (e.g., by scoring module 185). In some embodiments, the DV score may be calculated as a normalization of the vector generated by the product of the data source feature vectors and weight vectors.

In some embodiments, false positives may impact the DV score. For example, common names may appear multiple times in one or more data sources. For example, a search for "John Smith" in Florida on the NUWBER® website produced more than 1,000 query returns named "John Smith". In some aspects, additional PII features may be need to be considered in order to establish the correct search result, such that only information pertaining to the individual for which a DV score is being generated is considered.

Advantages of the techniques disclosed herein include providing a quantifiable value regarding the amount of PII features (information) that are available on online web resources. Further, the DV score reflects both PII features on public databases and social media sites as well as the dark web. Present embodiments capture a multitude of PII features, which are provided as input to the DV scoring module to provide a score reflective of online information across multiple platforms of the Internet, e.g., clear web, including public, private, social media, and the dark/deep web). The DV score provides a quantifiable measure as to how much information is available online.

Additional advantages of the techniques provided herein, include but are not limited to, providing a quantifiable measure (e.g., DV score) of an adversary's knowledge of an individual. The DV score may be customized to a specific individual by adjusting the weights of particular PII features. For example, the set of factors needed to identify a celebrity at risk may be different from the set of factors needed to identify a government official at risk. The DV analytics and scoring module 135 can determine the susceptibility of an individual person of being targeted for extortion, blackmail, or a cyberattack based on their online presence.

From the above, it will be appreciated that embodiments provided herein solve a problem rooted in computer technology, namely determining a user's susceptibility for becoming a victim of a cybercrime, based on their online presence.

The embodiments provided herein are an improvement over current techniques that consider the open web, as the present embodiments have the capability of mining online information both within the open web and within another part of the web, the dark web, which is generally not accessible to web-based search engines.

The embodiments presented herein provide automated techniques to identify individuals at a high risk of being targeted for a cybercrime, and may be a factor in whether or not a candidate is hired for a position involving access to confidential and/or sensitive information.

For individuals currently employed in a position involving access to sensitive and/or confidential information, the techniques provided herein may be used as part of an automated monitoring program. For example, the automated monitoring program may use the techniques provided herein to periodically determine a DV score for such individuals, and/or track changes in an individual's DV score. If the individual's risk score exceeds a predetermined threshold, and/or changes by a predetermined percentage, then a computer process may be initiated, manually or automatically, whereby the individual's accounts may be terminated or their access to sensitive/confidential information on their computer or other computers on a network may be limited or restricted, either permanently or until appropriate actions are taken (e.g., changing the user's permissions, reviewing the user's account for unauthorized access or activity, requiring the user to change their password, switching the user to a new account under a different name, etc.). For example, a monitoring server in communication with client computers over a network may include a DV Analytics and Scoring Module as described herein and a Security Module configured to periodically monitor a user's DV score and, if the user's risk score exceeds a predetermined threshold and/or changes more than a predetermined amount, initiate a remedial computer process that terminates a user account, changes a user's computer/network privileges, and/or implements some other type of digital security measure.

The embodiments presented herein may utilize machine learning techniques to improve scoring results. For example, as more data is collected, the machine learning system may: (1) identify which PII features are most predictive in identifying individuals with a high risk of becoming a victim of a cybercrime, and may be used to adjust weighting of these same features to improve predictive ability of the automated system; (2) identify which levels of association are most predictive in identifying individuals with a high risk of becoming a victim of a cybercrime, and may be used to adjust weighting of the levels of association to improve predictive ability of the automated system; or (3) both. For example, for confirmed victims of cybercrimes, PII may be collected for these individuals and provided to the machine learning system to identify PII features and corresponding feature strengths as well as association tiers and corresponding association strengths that are most predictive of whether an individual will be targeted for a cybercrime.

The above embodiments are not limited to the specific tasks or algorithms described above, but may be utilized for any process involving a risk score based on an online presence, wherein the risk score is determined from clear web and dark web resources. The DV analytics and scoring module can be utilized by corporations, entities, government agencies, intelligence agencies, law enforcement agencies, military branches, etc. to provide a quantifiable analysis of an adversaries' knowledge of personnel obtained from online data sources. Thus, the DV score provides an important resource to commercial organizations, government agencies, and other institutions, as it provides a quantifiable measure of a risk of being targeted for a cybercrime based on an online presence.

In another aspect, the DV analytics and scoring module 135 may be used to identify government assets that are sold and traded online. In this example, features specific to the government asset are used as query inputs and to generate the DV score. For example, if government property is stolen, criteria specific to the stolen property may be entered (in place of PII features) and used to search online resources to identify the location or possessor of the stolen property.

In another aspect, the DV analytics and scoring module 135 may be used as part of the process of screening individuals for granting a security clearance. Current investigations for granting security clearance include conducting interviews, reviewing financial history, identifying criminal history, and in some cases, performing a polygraph exam. By utilizing the DV analytics and scoring module 135, an end user can quantify the susceptibility of an individual of being a target of extortion or blackmail based on their online presence. Furthermore, the DV analytics and scoring module 135 provides an independent measure from other criteria for granting security clearance, as the results do not rely on financial or criminal history or the polygraph exam.

The computer readable program instructions may be executed on a computer or other computing device to cause a series of operational steps to be performed by the computer or other computing device, resulting in a computer implemented process that produces the desired result (e.g., a DV score 50).

The software as presented herein (e.g., modules including query engine 136, web browsing and automation tools 140, NLP extractors 150, spider programs 160, aggregator 170, analyzer 180) may be provided on a non-transitory computer readable medium (e.g., CD-ROM, DVD floppy diskettes, magnetic and/or optical mediums, memory devices such as USB keys or external hard drives, etc.) for use with the systems (or stand-alone systems) as described herein.

A computer-readable medium may include any number of persistent storage devices (e.g., magnetic disk drives, solid state storage, etc.) and/or transient memory devices (e.g., RAM). Computer readable storage medium include but are not limited to a portable compact disc read-only memory (CD-ROM), a portable computer diskette or floppy disk, a digital versatile disk (DVD), an erasable programmable read-only memory (EPROM or Flash memory), a hard disk, a memory stick, a random access memory (RAM), a read-only memory (ROM), a static random access memory (SRAM), etc., as well as any suitable combination of the foregoing. The computer readable code is stored on a non-transitory medium.

A computer readable program may be translated into instructions for performing operations according to the techniques set forth herein, including but not limited to: assembler instructions, configuration data for integrated circuitry, firmware instructions, instruction-set-architecture (ISA) instructions, machine instructions, machine dependent instructions, microcode, state-setting data, or either source code or object code written in any combination of one or more programming languages, including an object oriented programming languages, and procedural programming languages, such as the "C" programming language or similar programming languages, languages for performing natural language processing, etc. Computer readable program code or instructions, stored on the computer-readable storage medium, is configured such that, when executed by a processor, the code or instructions causes the processing system to perform steps described above.

In other embodiments, the server or any one or more of the modules of server 200 may be configured to perform the functions described above without the need for computer readable program code. For example, aggregator 170 (or analyzer 180, or any other suitable module) may comprise specialized hardware, such as one or more application-specific integrated circuits (ASICs). Hence, the features of the present invention described above may be implemented in hardware and/or software. For example, in some embodiments, the functional tiers described above may be implemented by executing computer instructions, by hardware independent of any computer instructions, or by any suitable combination of hardware and/or software.

The techniques presented herein may be applied to any desired type of computing environment (e.g., client-server, cloud-based computing, distributed computing, mainframe, network computing, stand-alone systems, etc.), and may be implemented by any number of any computing devices, including but not limited to desktops, servers, laptops, PDA, mobile devices, tablets, mainframes, etc.

The software corresponding to the techniques presented herein may be implemented in any suitable language, and may be developed by one of ordinary skill in the art, based upon the functional descriptions in the flowcharts and embodiments as set forth herein. Moreover, the software and/or algorithms as described herein are not limited to any particular order of operations, as set forth in the examples, but may include any order that accomplishes the functions as set forth herein. For example, two operations shown sequentially may, in fact, be executed substantially concurrently, or the operations may be executed in the reverse order, provided that the functionality for which the operations are designed in maintained.

While various embodiments and implementations of the present invention are described above and claimed, it should be understood that they have been presented by way of example only, and not limitation. For example, the digital vulnerability assessment system 1000 may generate and/or display one or some or all of the analytics described herein. Many modifications and variations will be apparent to those of ordinary skill in the art without departing from the scope and spirit of the invention. The embodiments illustrated herein were chosen in order to best explain the principles of operation and of practical applications. Thus, the breadth and scope of the present invention should not be limited by any of the above-described exemplary embodiments.

What is claimed is:

1. A computer implemented method of determining a digital vulnerability score indicating a risk of being targeted for a cyberattack for an individual comprising:
   receiving, by a query engine running on a processor, a query comprising an identifier corresponding to the individual;
   searching, using queries generated by the query engine, a plurality of data sources for content including the identifier, wherein at least one of the plurality of data sources comprises information from the clear web, and at least one of the plurality of data sources comprises information from the dark web;
   extracting, by a natural language processing extractor, one or more personal identifying information (PII) features from the content;
   determining, in a tiered hierarchy, a weighting comprising an association strength for each of the one or more extracted PII features, wherein the association strength decreases as a level of association between the identifier and a PII feature increases; and
   generating, using a data aggregator, a digital vulnerability (DV) score for the individual by aggregating the one or more weighted extracted PII features, wherein the DV score indicates the risk for the individual of a cyberattack.

2. The method of claim 1, wherein the level of association comprises the number of tiers needed to form an association of an extracted PII feature with the individual.

3. The method of claim 2, wherein a first tier level of association comprises an association of an extracted PII feature with the identifier directly from a data source.

4. The method of claim 3, wherein levels of association higher than the first tier comprise association of an extracted PII feature with the individual via one or more intermediate data sources.

5. The method of claim 4, further comprising validating a PII feature extracted via one or more intermediate data sources.

6. The method of claim 5, further comprising, after validating the PII feature, adjusting the association strength of the PII feature upwards to reflect a higher weighting.

7. The method of claim 1, further comprising:
generating a plurality of DV scores for the individual, wherein each DV score is generated at a different time; and
initiating, in response to the DV scores changing by a predetermined percentage over time, a computer process that implements a digital security measure with respect to a user account associated with the individual.

8. The method of claim 1, further comprising:
initiating, in response to generating a DV score for an individual that exceeds a predetermined threshold, a computer process that implements a digital security measure with respect to a user account associated with the individual.

9. The method of claim 8, wherein the digital security measure implemented by the computer process comprises terminating the user account associated with the individual.

10. The method of claim 9, wherein the digital security measure implemented by the computer process comprises restricting the individual's access to sensitive/confidential information on their computer or other computers on a network.

11. A system for determining a digital vulnerability score for an individual indicating a risk of being targeted for a cyberattack, the system comprising:
one or more hardware processors and a memory storing program instructions executable by the one or more hardware processors to:
receive, by a query engine running on the one or more hardware processors, a query comprising an identifier corresponding to the individual;
search, using queries generated by the query engine, a plurality of data sources for content including the identifier, wherein at least one of the plurality of data sources comprises information from the clear web, and at least one of the plurality of data sources comprises information from the dark web;
extract, by a natural language processing extractor running on the one or more hardware processors, one or more personal identifying information (PII) features from the content;
determine, by a scoring module of an analyzer running on the one or more hardware processors, in a tiered hierarchy, a weighting for each of the one or more extracted PII features, the weighting comprising an association strength for each of the one or more extracted PII features, wherein the association strength decreases as a level of association between the identifier and a PII feature increases; and
generate, using a data aggregator running on the one or more hardware processors, a digital vulnerability (DV) score for the individual by aggregating the one or more weighted extracted PII features, wherein the DV score indicates the risk for the individual of a cyberattack.

12. The system of claim 11, wherein the level of association comprises the number of tiers needed to form an association of an extracted PII feature with the individual.

13. The system of claim 12, wherein a first tier level of association comprises an association of an extracted PII feature with the identifier directly from a data source.

14. The method of claim 13, wherein levels of association higher than the first tier comprise association of an extracted PII feature with the individual via one or more intermediate data sources.

15. The method of claim 14, further comprising validating a PII feature extracted via one or more intermediate data sources.

16. The method of claim 15, further comprising, after validating the PII feature, adjusting the association strength of the PII feature upwards to reflect a higher weighting.

17. A computer program product for determining digital vulnerability, the computer program product comprising a computer readable storage medium having program instructions embodied therewith, the program instructions executable by one or more processors to:
generate a query engine configured to receive a query comprising an identifier corresponding to the individual;
search, using queries generated by the query engine, a plurality of data sources for content including the identifier, wherein at least one of the plurality of data sources comprises information from the clear web, and at least one of the plurality of data sources comprises information from the dark web;
generate a natural language processing extractor to extract one or more personal identifying information (PII) features from the content;
determine, in a tiered hierarchy, a weighting for each of the one or more extracted PII features, the weighting comprising an association strength for each of the one or more extracted PII features, wherein the association strength decreases as a level of association between the identifier and a PII feature increases; and
generate a data aggregator to determine a digital vulnerability (DV) score for the individual by aggregating the one or more weighted extracted PII features, wherein the DV score indicates the risk for the individual of a cyberattack.

18. The computer program product of claim 17, wherein the level of association comprises the number of tiers needed to form an association of an extracted PII feature with the individual.

19. The system of claim 18, wherein a first tier level of association comprises an association of an extracted PII feature with the identifier directly from a data source.

20. The method of claim 19, wherein levels of association higher than the first tier comprise association of an extracted PII feature with the individual via one or more intermediate data sources.

21. The method of claim 20, further comprising validating a PII feature extracted via one or more intermediate data sources.

22. The method of claim 21, further comprising, after validating the PII feature, adjusting the association strength of the PII feature upwards to reflect a higher weighting.

* * * * *